US009109970B2

(12) United States Patent
Blosch et al.

(10) Patent No.: US 9,109,970 B2
(45) Date of Patent: Aug. 18, 2015

(54) METHOD FOR CIRCUIT SEPARATION TESTING IN A DOUBLE GEARWHEEL PUMP

(75) Inventors: Georg Blosch, Murr (DE); Norbert Alaze, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 13/982,886

(22) PCT Filed: Jan. 31, 2011

(86) PCT No.: PCT/EP2011/051305
§ 371 (c)(1),
(2), (4) Date: Dec. 16, 2013

(87) PCT Pub. No.: WO2012/103921
PCT Pub. Date: Aug. 9, 2012

(65) Prior Publication Data
US 2014/0090462 A1 Apr. 3, 2014

(51) Int. Cl.
*G01L 5/28* (2006.01)
*B60T 8/40* (2006.01)
*B60T 8/88* (2006.01)
*B60T 17/22* (2006.01)
*F04C 2/10* (2006.01)
*F04C 11/00* (2006.01)

(52) U.S. Cl.
CPC ............ *G01L 5/28* (2013.01); *B60T 8/4031* (2013.01); *B60T 8/88* (2013.01); *B60T 17/226* (2013.01); *F04C 2/10* (2013.01); *F04C 11/001* (2013.01); *F04C 2270/80* (2013.01)

(58) Field of Classification Search
CPC . B60T 13/686; B60T 17/22; B60T 2270/413; B60T 2270/88; G01L 5/28
USPC .......................................................... 73/121
See application file for complete search history.

(56) References Cited

U.S. PATENT DOCUMENTS

| 6,273,525 | B1* | 8/2001 | Erban et al. ...................... 303/11 |
| 6,398,318 | B1* | 6/2002 | Braun ....................... 303/122.03 |
| 6,517,170 | B1* | 2/2003 | Hofsaess et al. ................. 303/11 |
| 6,749,270 | B1* | 6/2004 | Lutz et al. ................... 303/113.2 |

(Continued)

FOREIGN PATENT DOCUMENTS

DE 100 53 991 A1 5/2002
DE 10 2006 014 269 A1 10/2007

(Continued)

OTHER PUBLICATIONS

International Search Report corresponding to PCT Application No. PCT/EP2011/051305, mailed Oct. 7, 2011 (German and English language document) (8 pages).

*Primary Examiner* — Freddie Kirkland, III
(74) *Attorney, Agent, or Firm* — Maginot, Moore & Beck LLP

(57) ABSTRACT

A method for circuit separation testing in a double gearwheel pump having two gearwheel pumps includes charging one of the two gearwheel pumps with pressure and measuring the pressure build-up in the charged gearwheel pump and/or the pressure-build up in the other gearwheel pump. The pressure build-up is preferably realized by the gearwheel pump itself. The gearwheel pumps have a common pump shaft and are preferably configured as hydraulic pumps of a hydraulic vehicle brake system with slip control. The method detects any leak at the leadthrough of the pump shaft through a partition wall between the two gearwheel pumps.

10 Claims, 2 Drawing Sheets

(56) References Cited

U.S. PATENT DOCUMENTS

| | | | |
|---|---|---|---|
| 8,342,617 B2 * | 1/2013 | Oosawa | 303/116.1 |
| 8,573,714 B2 * | 11/2013 | Nishimura et al. | 303/155 |
| 8,777,335 B2 * | 7/2014 | Furuyama | 303/155 |
| 8,898,024 B2 * | 11/2014 | Gilles | 702/50 |
| 8,899,698 B2 * | 12/2014 | Noda et al. | 303/119.3 |
| 8,915,080 B2 * | 12/2014 | Koth | 60/566 |
| 2003/0234574 A1 * | 12/2003 | Reuter et al. | 303/116.2 |
| 2009/0226298 A1 | 9/2009 | Kajiyama et al. | |
| 2010/0322810 A1 * | 12/2010 | Schepp et al. | 418/199 |
| 2013/0238207 A1 * | 9/2013 | Gonzalez Romero et al. | 701/70 |

FOREIGN PATENT DOCUMENTS

| | | | |
|---|---|---|---|
| DE | 102006014269 A1 * | 10/2007 | |
| DE | 10 2007 054 808 A1 | 5/2009 | |
| DE | 10 2009 047 213 A1 | 6/2011 | |
| EP | 0 487 507 A2 | 5/1992 | |
| EP | 0 933 275 A2 | 8/1999 | |
| JP | 2011-503428 A | 1/2011 | |

* cited by examiner

METHOD FOR CIRCUIT SEPARATION TESTING IN A DOUBLE GEARWHEEL PUMP

This application is a 35 U.S.C. §371 National Stage Application of PCT/EP2011/051305, filed on Jan. 31, 2011, the disclosure of which is incorporated herein by reference in its entirety.

BACKGROUND

The disclosure relates to a method for circuit separation testing in a double gearwheel pump having the features of the disclosure. "Circuit separation testing" is intended to mean testing of leaktightness between the two gearwheel pumps of the double gearwheel pump or testing for leakage from one to the other gearwheel pump. The term "circuit separation testing" stems from the (possible) use of the double gearwheel pump in a hydraulic, slip-controlled vehicle brake system, in which each of the two gearwheel pumps is assigned to one brake circuit which are and must be separated from one another hydraulically.

German Offenlegungsschrift DE 10 2007 054 808 A1 discloses a double internal gearwheel pump having two internal gearwheel pumps which are arranged adjacent to one another on the same axis and have a common pump shaft for driving them. The two internal gearwheel pumps are arranged in a pump casing. The pump shaft is passed rotatably through a partition wall, which is arranged in the pump casing between the two internal gearwheel pumps and separates the two internal gearwheel pumps from one another. In the known double internal gearwheel pump, the partition wall is a separate component which is inserted into the pump casing and can also be interpreted as part of the pump casing. Integral formation of the partition wall with the pump casing or with part of the pump casing is also possible.

The pump shaft is sealed off in the partition wall by means of two axially spaced seals. A leakage duct which opens between the two seals carries off any leakage that may occur if one or both of the seals is leaky to a pump inlet of one of the two internal gearwheel pumps.

The known double internal gearwheel pump is provided for a hydraulic dual circuit vehicle brake system with a slip control system, such as ABS, ASR, ESP and/or FDR. Each of the two internal gearwheel pumps is arranged hydraulically in one of the two brake circuits. For reasons of functional reliability, "circuit separation" is absolutely essential. "Circuit separation" refers to hydraulic separation of the two brake circuits. Circuit separation in the double internal gearwheel pump can be nullified if the two internal gearwheel pumps are connected to one another hydraulically due to leakage, and this must absolutely be avoided. By means of the two seals which seal off the pump shaft in the partition wall of the pump casing of the double internal gearwheel pump, circuit separation is assured if at least one of the two seals is leaktight.

SUMMARY

The method according to the disclosure envisages pressurizing one of the two gearwheel pumps of a double gearwheel pump and testing the pressure in at least one of the two gearwheel pumps. The word "in" does not indicate the measurement location but indicates which pressure is tested, namely the pressure prevailing in at least one of the two gearwheel pumps. A pressure sensor can be located outside the gearwheel pump. Pressurization can be accomplished by means of the gearwheel pump itself or in some other way. It is possible to test whether the pressure rises in the other gearwheel pump, this being a clear indication of leakiness in the sealing between the two gearwheel pumps. Pressure testing can be carried out in or outside the gearwheel pump, that is to say, for example, also by means of a pressure sensor that is present in any case in the brake circuit to which the gearwheel pump is assigned. It is expedient if the gearwheel pump is separated hydraulically from the brake circuit by, for example, closing (solenoid) valves to ensure that leakage between the two gearwheel pumps leads to a pressure rise in the gearwheel pump which is per se not pressurized. During measurement in the brake circuit, the circuit should be shut off by closing valves in such a way that there is a pressure rise.

For circuit separation testing, the pressure can also be measured in or at the gearwheel pump which is pressurized. For example, valves in the brake circuit in which the gearwheel pump is arranged are closed, preventing a hydraulic pressure from escaping, and a pressure is built up before or after the closure of the valves. If the pressure falls, this is an indication of leakage between the gearwheel pumps or possibly also at some other point. For circuit separation testing, measurement of a rate of pressure rise and/or an achievable pressure level is also possible. Deviations from normal values, in particular a slower pressure buildup or a low achievable pressure level indicate leakiness. This enumeration of testing options is not exhaustive.

The disclosure provides a simple and economical possibility for circuit separation testing when using a double gearwheel pump in a hydraulic dual circuit vehicle brake system. Structural measures are not normally required. The disclosure allows the use of a double gearwheel pump in which the lead-through for the pump shaft through the partition wall is sealed off by just one seal; a second seal can be omitted. An additional advantage is the possibility of detecting leakiness.

The dependent claims relate to advantageous embodiments and developments of the disclosure.

The disclosure is of general application to double gearwheel pumps which have a common pump shaft that passes rotatably and in a sealed manner through a partition wall, i.e. both to (external) gearwheel pumps and to internal gearwheel pumps. In particular, the disclosure envisages the more compact construction of a double internal gearwheel pump with two internal gearwheel pumps. In principle, the disclosure can also be used for multiple gearwheel pumps comprising more than two gearwheel pumps. The term "double gearwheel pump" should also be taken more generally to refer also to a multiple gearwheel pump.

BRIEF DESCRIPTION OF THE DRAWINGS

The disclosure is explained below with reference to the drawings, in which.

DETAILED DESCRIPTION

Figure 1:
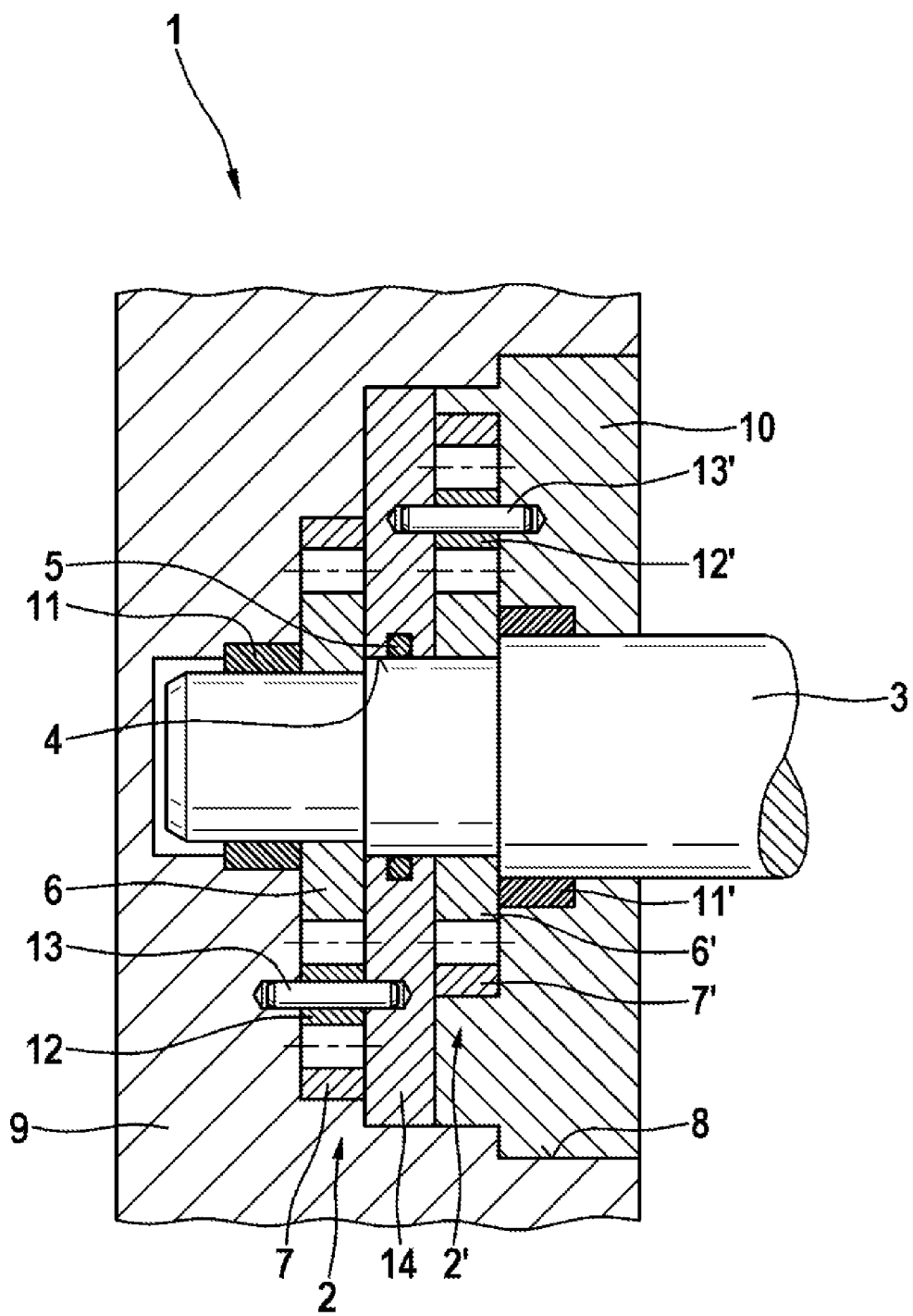
FIG. 1 shows an axial section through a double internal gearwheel pump.

The double internal gearwheel pump 1 according to the disclosure which is illustrated in FIG. 1 has two internal gearwheel pumps 2, 2', which are separated hydraulically from one another and have a common pump shaft 3 for driving them. The internal gearwheel pumps 2, 2' are provided as hydraulic pumps for the two brake circuits of a hydraulic vehicle brake system illustrated in FIG. 2, which has a slip control system (ABS, ASR, ESP, FDR). Hydraulic pumps of this kind are also referred to as return pumps and are usually designed as piston pumps and not, as in the present case, as internal gearwheel pumps 2, 2'. The disclosure can also be employed in the same way for (external) gearwheel pumps. The two internal gearwheel pumps 2, 2' are arranged in mutually parallel radial planes relative to the pump shaft 3 and at an axial distance from one another, and between them there is a partition wall 14 for spatial and hydraulic separation of the internal gearwheel pumps 2, 2'. The pump shaft 3 passes through a through hole 4 in the partition wall 14 and is sealed off there by means of a sealing ring 5. Both internal gearwheel pumps 2, 2' have pinions 6, 6', which can also be referred to as (external) gearwheels. The pinions 6, 6' are secured on the pump shaft 3 for conjoint rotation therewith and, by virtue of the common pump shaft 3, are coaxial with one another. The pinions 6, 6' are surrounded by ring gears 7, 7', which are arranged eccentrically with respect to the pump shaft 3 and with respect to the pinions 4, 4' and mesh with the pinions 6, 6' at one point or in one region of a circumference. In this embodiment, the ring gears 7, 7' have an opposed eccentricity, i.e. an offset of 180° in the circumferential direction.

The two internal gearwheel pumps 2, 2' are arranged in a blind hole 8 of stepped diameter in a pump casing 9, which is closed by a casing cover 10. The ring gears 6, 6' are mounted rotatably in the pump casing 9 or in the casing cover 10. The pump shaft 3 is supported rotatably in the pump casing 9 and in the casing cover 10 on both sides of the internal gearwheel pumps 2, 2' by means of bearings 11, 11'. The partition wall 14 is arranged in a step of the blind hole 8 in the pump casing 9. In this embodiment of the disclosure, the pump casing 9 is formed by a hydraulic block of the slip control system of the vehicle brake system illustrated in FIG. 2. Such hydraulic blocks for slip-controlled hydraulic vehicle brake systems are known per se, and, apart from the double internal gearwheel pump 1, additional hydraulic components such as solenoid valves, check valves and hydraulic accumulators can be inserted therein and connected to one another by bores to form hydraulic circuits. The hydraulic block is connected hydraulically to a brake master cylinder, and wheel brakes are connected hydraulically to the hydraulic block. However, the disclosure can also be employed for double internal gearwheel pumps or, more generally, for double gearwheel pumps which have a separate pump casing.

Crescent-shaped elements 12, 12' are arranged pivotably on pins 13, 13' between the pinions 6, 6' and the ring gears 7, 7' of the two internal gearwheel pumps 2, 2', being located opposite the point at which the pinions 6, 6' and the ring gears 7, 7' mesh. The crescent-shaped elements 12, 12' extend over a limited distance in the circumferential direction, and tooth tips of teeth of the pinions 4, 4' slide along the inner circumference thereof, and tips of teeth of the ring gears 7, 7' slide along the outer circumference thereof. The crescent-shaped elements 12, 12' close interspaces between the teeth of the pinions 6, 6' and of the ring gears 7, 7' at the circumference in order to allow pumping of brake fluid or, more generally, of a liquid or of a fluid. The internal gearwheel pumps 2, 2' are thus "crescent pumps", although the disclosure is not restricted to this design but can also have annular gear pumps (not illustrated).

Figure 2:
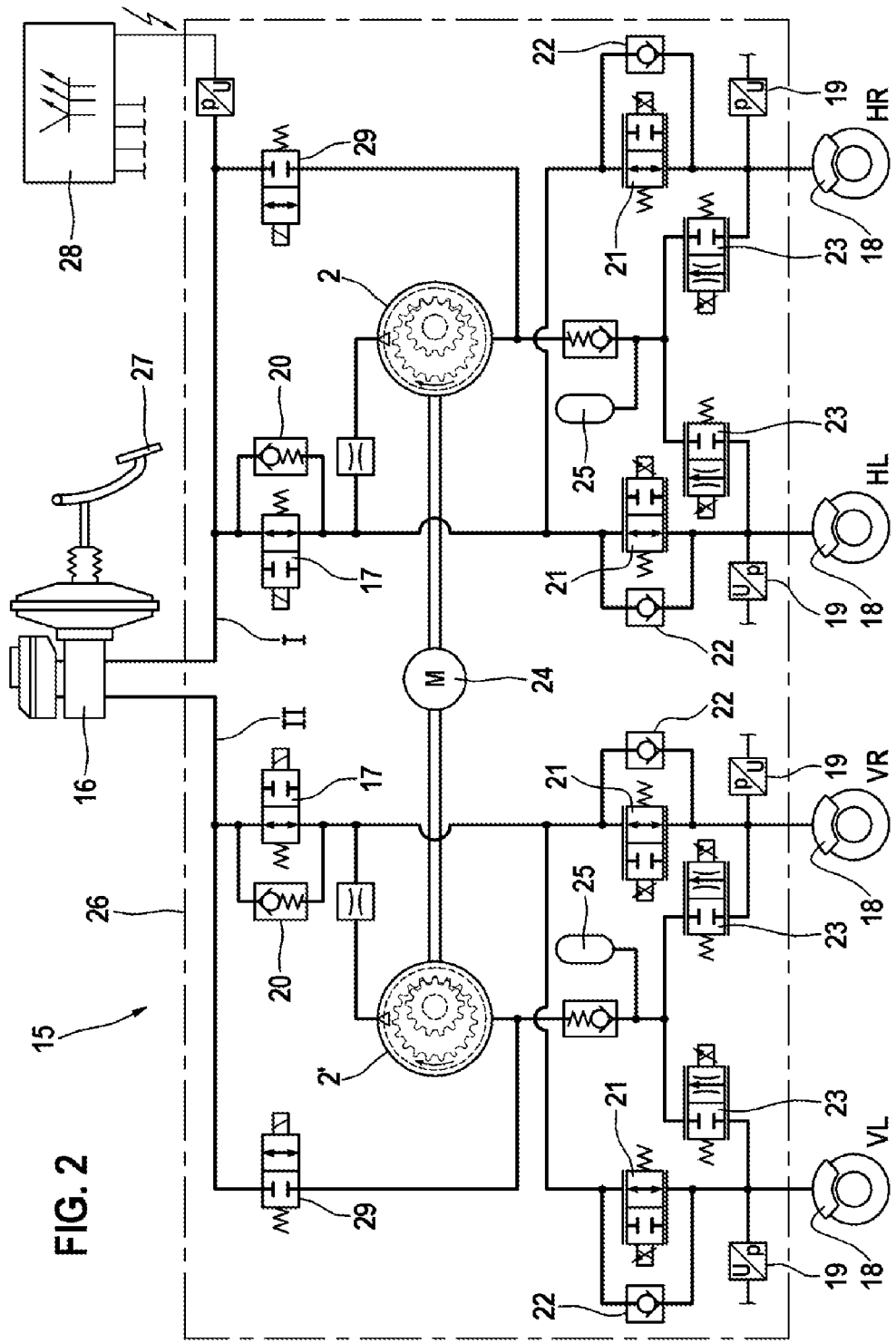
FIG. 2 shows a hydraulic circuit diagram of a dual circuit vehicle brake system.

The hydraulic vehicle brake system 15 according to the disclosure, which is illustrated in FIG. 2, is designed as a dual circuit brake system with two brake circuits I, II, which are connected to a brake master cylinder 16. Each brake circuit I, II is connected to the brake master cylinder 16 via an isolating valve 17. The isolating valves 17 are 2/2-way solenoid valves that are open in the deenergized home position thereof. Respective check valves 20, through which fluid can flow from the brake master cylinder 16 to wheel brakes 18, are connected hydraulically in parallel with the isolating valves 17. The wheel brakes 18 are connected to the isolating valve 17 of each brake circuit I, II by brake pressure buildup valves 21. The brake pressure buildup valves 21 are 2/2-way solenoid valves that are open in the deenergized home position thereof. Connected in parallel therewith are check valves 22, through which fluid can flow from the wheel brakes 18 toward the brake master cylinder 16.

Connected to each wheel brake 18 is a brake pressure reduction valve 23, said valves being connected jointly to an intake side or a pump inlet of a hydraulic pump, which is also referred to as a return pump. The hydraulic pumps are the internal gearwheel pumps 2, 2' of the double internal gearwheel pump 1 from FIG. 1. The brake pressure reduction valves 23 are designed as 2/2-way solenoid valves that are closed in the deenergized home position thereof. A delivery side or a pump outlet of the internal gearwheel pumps 2, 2' is connected between the brake pressure buildup valves 21 and the isolating valves 17, i.e. the pump outlet of the internal gearwheel pumps 2, 2' is connected to the wheel brakes 18 by the brake pressure buildup valves 21 and is connected to the brake master cylinder 16 by the isolating valve 17. For better open-loop and closed-loop control, the brake pressure buildup valves 21 and the brake pressure reduction valves 23 are proportional valves.

Each of the two brake circuits I, II has an internal gearwheel pump 2, 2', and said pumps can be driven jointly via the pump shaft 3 by means of a pump motor (electric motor). The pump inlets of the internal gearwheel pumps 2, 2' are connected to the brake pressure reduction valves 23. There are hydraulic accumulators 25 on the inlet side of the internal gearwheel pumps 2, 2' for receiving and temporarily storing brake fluid, which flows out of the wheel brakes 18 due to the opening of the brake pressure reduction valves 23 during a slip control operation.

The brake pressure buildup valves 21 and the brake pressure reduction valves 23 form wheel brake pressure modulation valve arrangements, by means of which wheel-specific brake pressure control for the purpose of slip control is possible in a manner known per se (which will not be explained here) when the internal gearwheel pumps 2, 2' are being driven. During a slip control operation, the isolating valves 17 can be closed, i.e. the vehicle brake system is separated hydraulically from the brake master cylinder 16.

For a rapid pressure buildup when the brake master cylinder 16 is not actuated, the vehicle brake system 15 has an intake valve 29 in each brake circuit I, II, by means of which the pump inlet of the internal gearwheel pump 2, 2' can be connected to the brake master cylinder 16. The intake valves 29 are designed as 2/2-way solenoid valves that are closed in the deenergized home position thereof.

The brake pressure buildup valves 21, the brake pressure reduction valves 23, the isolating valves 17, the intake valves 29 and the internal gearwheel pumps 2, 2', which can be driven by means of the pump motor 24, are part of a slip control system 26 (antilock brake system ABS, traction control system ASR, vehicle dynamics control system FDR, ESP) of the vehicle brake system 15. By means of the slip control system 26, i.e. by means of the internal gearwheel pumps 2, 2', a wheel brake pressure can be produced in the wheel brakes 18, even when the brake master cylinder 16 is not actuated, and can be controlled in a wheel-specific manner by means of the brake pressure buildup valves 21 and the brake pressure reduction valves 23.

The solenoid valves, check valves, hydraulic accumulators and the double internal gearwheel pump 1 comprising the internal gearwheel pumps 2, 2' are installed in a hydraulic block (not illustrated) and are hydraulically interconnected by the hydraulic block. The hydraulic block is connected hydraulically to the brake master cylinder 16, and the wheel brakes 18 are connected hydraulically to the hydraulic block 16.

Brake actuation is accomplished in a conventional manner through muscle power by pressing down a (foot) brake pedal 27 or, in the case of a hand brake, it would be necessary to pull a (hand) brake lever. The operation of the slip control system 26 is known to a person skilled in the art and is not explained in detail here. Hydraulic separation of the two brake circuits I, II is important for reasons of safety because only reliable hydraulic separation ensures the operation of one brake circuit I, II if the other brake circuit II, I fails, e.g. if, due to leakiness in the other brake circuit II, I, no pressure buildup is possible. The hydraulic separation of the two internal gearwheel pumps 2, 2' of the double internal gearwheel pump 1 is important for the hydraulic separation of the two brake circuits I, II, referred to as "circuit separation", said pumps being sealed off from one another by the sealing ring 5 at the lead-through for the pump shaft 3 through the partition wall 14.

The leaktightness of the sealing of the lead-through for the pump shaft 3 through the partition wall 14 must therefore be testable. For this purpose, according to the disclosure, one of the two internal gearwheel pumps 2, 2' is hydraulically pressurized, and the pressure in the pressurized internal gearwheel pump 2, 2' and/or in the other internal gearwheel pump 2', 2 is tested. For example, the profile of the pressure buildup, e.g. the time required to reach a particular pressure, is measured and tested, or the maximum pressure that can be built up is tested. The measured values are compared with setpoints which the internal gearwheel pump 2, 2' exhibits when the sealing of the lead-through for the pump shaft 3 through the partition wall 14 is leaktight and the circuit separation of the vehicle brake system 15 is intact. A deviation, in particular a slower pressure buildup or a lower maximum pressure, indicates leakiness. Another possibility or an additional possibility is to measure the pressure in the internal gearwheel pump 2', 2 which is not pressurized. Even a slight pressure buildup in the other internal gearwheel pump 2', 2 which is not pressurized per se when there is a pressure buildup in the first internal gearwheel pump 2, 2' indicates leakiness of the sealing of the lead-through for the pump shaft 3 through the partition wall 14 or even nullification of the hydraulic separation of the two brake circuits I, II at some other point in the double internal gearwheel pump 1 or the vehicle brake system 15.

The pressure buildup can be accomplished by means of the internal gearwheel pump 2, 2' itself by driving it with the pump motor 24. For the pressure buildup, the isolating valve 17 and hence the pump outlet of the pressurized internal gearwheel pump 2, 2' is closed, while the isolating valve 17 of the other internal gearwheel pump 2', 2 remains open to ensure that no pressure buildup takes place there. The brake pressure reduction valves 23 remain close, with the result that the pump outlet is closed there too. At least one brake pressure buildup valve 21 can remain open to enable the pressure in the internal gearwheel pump 2, 2' to be measured by means of a wheel brake pressure sensor 19 connected to each wheel brake 18. By closing both brake pressure buildup valves 21, the internal gearwheel pump 2, 2' can be closed directly at the pump outlet thereof, improving the result of measurement but excluding measurement of the pressure in the internal gearwheel pump 2, 2' by means of the wheel brake pressure sensors 19. For the brake pressure buildup, the internal gearwheel pump 2, 2' draws in brake fluid from the hydraulic accumulator 25 at the pump inlet thereof or, if the intake valve 29 is opened, from the brake master cylinder 16.

At the other internal gearwheel pump 2', 2, the isolating valve 17 remains open during the pressure buildup in the first internal gearwheel pump 2, 2' to ensure that no pressure buildup takes place in the other internal gearwheel pump 2', 2. Only after the pressure in the first internal gearwheel pump 2, 2' has been built up is the isolating valve 17 of the other internal gearwheel pump 2', 2 closed, so that any pressure buildup caused by leakiness of the sealing ring 5 of the double internal gearwheel pump 1 can be measured by means of one of the wheel brake pressure sensors 19. Among the advantages of the method according to the disclosure is that it can be carried out with the existing components of the vehicle brake system 15 and that no structural modifications have to be made. Another advantage of the disclosure is that it enables the lead-through for the pump shaft 3 through the partition wall 14 to be sealed off with one sealing ring 5 because any leakiness can be detected. Otherwise, double sealing would be required at this point in order to ensure circuit separation, i.e. the hydraulic separation of the two brake circuits I, II. The method according to the disclosure can also be referred to as circuit separation testing because it allows testing of whether the two brake circuits I, II of the vehicle brake system 15 are hydraulically separated from one another.

The invention claimed is:

1. A method for circuit separation testing in a double gearwheel pump, comprising:
   closing a pump outlet of a first gearwheel pump of two gearwheel pumps arranged in a pump casing to build up pressure in the first gearwheel pump, the gearwheel pumps having a common pump shaft that passes rotatably and in a sealed manner through a partition wall arranged between the two gearwheel pumps;
   after the pressure buildup, closing a pump inlet of the first gearwheel pump;
   closing a pump inlet and a pump outlet of a second gearwheel pump of the two gearwheel pumps; and
   testing a pressure in the second gearwheel pump to determine whether the pressure in the second gearwheel pump rises.

2. The method as claimed in claim 1, wherein the double gearwheel pump is a double internal gearwheel pump and the two gearwheel pumps are internal gearwheel pumps.

3. The method as claimed in claim 1, further comprising:
   measuring a pressure profile during one or more of the pressure buildup and a pressure drop after the pressure buildup; and
   comparing the pressure profile with a setpoint profile.

4. The method as claimed in claim 3, wherein the testing of the pressure in the second gearwheel pump includes measuring a brake pressure using a wheel brake pressure sensor configured to measure the brake pressure of a wheel brake of the second brake circuit.

5. The method as claimed in claim 1, wherein:
   the first gearwheel pump is a hydraulic pump in a first brake circuit of a hydraulic dual circuit vehicle brake system which has a slip control system, and
   the second gearwheel pump is a hydraulic pump in a second brake circuit of the hydraulic dual circuit vehicle brake system.

6. The method as claimed in claim 5, further comprising:
   closing an isolating valve fluidly positioned between a brake master cylinder and the pump outlet of the second gearwheel pump to close the pump outlet of the second gearwheel pump for testing.

7. A method for circuit separation testing in a double gearwheel pump, comprising:
   pressurizing a first gearwheel pump of two gearwheel pumps arranged in a pump casing to a maximum pressure that the first gearwheel pump can produce, the two gearwheel pumps having a common pump shaft that passes rotatably and in a sealed manner through a partition wall arranged between the two gearwheel pumps;
   measuring the maximum pressure built up with the first gearwheel pump; and
   comparing the maximum pressure with a setpoint to test the circuit separation.

8. The method as claimed in claim 7, further comprising:
   closing one or more of a pump inlet and a pump outlet of at least one of the two gearwheel pumps.

9. The method as claimed in claim 7, further comprising:
   closing a pump outlet of the first gearwheel pump to pressurize the first gearwheel pump;
   closing a pump inlet of the first gearwheel pump after pressurizing the first gearwheel pump.

10. The method as claimed in claim 7, wherein:
    the first gearwheel pump is a hydraulic pump in a first brake circuit of a hydraulic dual circuit vehicle brake system which has a slip control system,
    the second gearwheel pump is a hydraulic pump in a second brake circuit of the hydraulic dual circuit vehicle brake system, and
    the measuring of the maximum pressure built up with the first gearwheel pump includes measuring a brake pressure using a wheel brake pressure sensor configured to measure the brake pressure of a wheel brake of the first brake circuit.

* * * * *